United States Patent
Katayama et al.

(10) Patent No.: US 8,692,152 B2
(45) Date of Patent: Apr. 8, 2014

(54) LASER LAP WELDING METHOD FOR GALVANIZED STEEL SHEETS

(75) Inventors: Seiji Katayama, Suita (JP); Yosuke Kawahito, Suita (JP)

(73) Assignee: Suzuki Motor Corporation (JP)

(*) Notice: Subject to any disclaimer, the term of this patent is extended or adjusted under 35 U.S.C. 154(b) by 169 days.

(21) Appl. No.: 12/997,734

(22) PCT Filed: Jul. 8, 2009

(86) PCT No.: PCT/JP2009/062443
§ 371 (c)(1),
(2), (4) Date: Dec. 13, 2010

(87) PCT Pub. No.: WO2010/005025
PCT Pub. Date: Jan. 14, 2010

(65) Prior Publication Data
US 2011/0095002 A1    Apr. 28, 2011

(30) Foreign Application Priority Data
Jul. 9, 2008   (JP) ................................. 2008-178761

(51) Int. Cl.
B23K 26/20 (2006.01)
B23K 26/24 (2006.01)

(52) U.S. Cl.
USPC ................................. 219/121.64; 219/121.61

(58) Field of Classification Search
USPC ............................ 219/121.61–121.64, 121.83
See application file for complete search history.

(56) References Cited

U.S. PATENT DOCUMENTS

| 4,000,392 | A | * | 12/1976 | Banas et al. ............. 219/121.63 |
| 4,682,002 | A | | 7/1987 | Delle Piane et al. |
| 5,183,992 | A | * | 2/1993 | Bilge et al. ............... 219/121.64 |
| 5,595,670 | A | * | 1/1997 | Mombo-Caristan ..... 219/121.64 |
| 6,770,841 | B2 | | 8/2004 | Briand et al. |

(Continued)

FOREIGN PATENT DOCUMENTS

| CN | 101043968 A | 9/2007 |
| DE | 19715102 A1 | 10/1998 |

(Continued)

OTHER PUBLICATIONS

International Search Report corresponding to International Application No. PCT/JP2009/062443 mailed Oct. 13, 2009.

(Continued)

*Primary Examiner* — Samuel M Heinrich
(74) *Attorney, Agent, or Firm* — Myers Bigel Sibley & Sajovec, P.A.

(57) ABSTRACT

A laser lap welding method, for a galvanized steel sheet, includes preparing two steel sheets in lap configuration, at least one of which is the galvanized steel sheet, so that a galvanized layer thereof is located at an interface of the steel sheets; and irradiating a surface of any one of the two steel sheets in an overlapped region with a laser to perform lap welding. The welding is performed by applying the laser to travel at a predetermined power density and at a predetermined traveling velocity so as to partially and temporarily form an elongated hole in a molten pool extending backward from a laser irradiation spot at least in the steel sheet on the surface side, whereby metal vapor produced by laser irradiation is vented through the elongated hole backward in a laser traveling direction and in a laser irradiation source side.

9 Claims, 2 Drawing Sheets

(56) References Cited

U.S. PATENT DOCUMENTS

| | | |
|---|---|---|
| 7,091,444 B2 | 8/2006 | Becker et al. |
| 2004/0118819 A1* | 6/2004 | Danzer .................. 219/121.64 |
| 2007/0084835 A1 | 4/2007 | Dinauer et al. |
| 2008/0029498 A1 | 2/2008 | Forrest et al. |
| 2008/0210672 A1 | 9/2008 | Meyer et al. |
| 2009/0050608 A1 | 2/2009 | Hayashi et al. |
| 2009/0266801 A1 | 10/2009 | Oku et al. |
| 2011/0095002 A1 | 4/2011 | Katayama et al. |

FOREIGN PATENT DOCUMENTS

| | | |
|---|---|---|
| DE | 101 24 345 A1 | 11/2002 |
| EP | 1118420 A2 | 7/2001 |
| JP | 60-210386 | 10/1985 |
| JP | 61-74793 | 4/1986 |
| JP | 61-135495 | 6/1986 |
| JP | 07-155974 | 6/1995 |
| JP | 10-193149 | 7/1998 |
| JP | 2000-326080 | 11/2000 |
| JP | 2002-160082 | 6/2002 |
| JP | 2002-331375 | 11/2002 |
| JP | 2003053544 A * | 2/2003 |
| JP | 2003-094185 | 4/2003 |
| JP | 2004-066267 | 3/2004 |
| JP | 2004-261849 | 9/2004 |
| JP | 2005-144504 | 6/2005 |
| JP | 2005-262226 | 9/2005 |
| JP | 2006-000924 | 1/2006 |
| JP | 2007-038269 | 2/2007 |
| JP | 2008-049362 | 3/2008 |
| WO | WO 2006/046608 A1 | 5/2006 |
| WO | WO 2010/005025 A1 | 1/2010 |

OTHER PUBLICATIONS

Office Action corresponding to German Application No. 11 2009 001 685.5 dated Jun. 5, 2012.

First Chinese Office Action corresponding to Chinese Application No. 2013032000790720 issued Mar. 25, 2013.

First Chinese Office Action corresponding to Chinese Application No. 200980126515.3 issued Mar. 25, 2013.

Inquiry corresponding to Japanese Application No. 2010-519799 issued Sep. 10, 2013.

* cited by examiner

LASER LAP WELDING METHOD FOR GALVANIZED STEEL SHEETS

RELATED APPLICATIONS

This application is a 35 U.S.C. §371 national stage application of PCT Application No. PCT/JP2009/062443, filed on Jul. 8, 2009, which claims priority from Japanese Application No. 2008-178761 filed Jul. 9, 2008, the contents of which are incorporated herein by reference in their entireties. The above-referenced PCT International Application was published as International Publication No. WO 2010/005025 A1 on Jan. 14, 2010.

TECHNICAL FIELD

The present invention relates to a laser lap welding method for a galvanized steel sheet, and particularly to a laser lap welding method for a galvanized steel sheet which is performed when a large number of galvanized steel sheets are lap-welded with a laser in the automobile industry and the like.

BACKGROUND ART

In the automobile industry, steel sheets plated with zinc (hereinafter referred to as "galvanized steel sheets") are widely used because of excellent corrosion resistance, high specific strength, and low cost thereof. In such a case, some types of application require two galvanized steel sheets to be overlaid and welded together. It is said that laser beam welding is preferable, which has excellent characteristics such as the capability of high-accuracy, high-quality, and high-speed processing compared to spot welding and the like.

When two galvanized steel sheets are overlaid and welded with a laser (hereinafter, such welding is also referred to as "laser lap welding"), for example, the galvanized steel sheets are overlaid on top of each other with the galvanized layers facing each other, and irradiated with a laser beam from a carbonic acid gas laser or a YAG laser. Thus, the upper and lower galvanized steel sheets are melted and joined together.

To perform favorable bonding, iron layers of the upper and lower galvanized steel sheets need to interpenetrate. However, the melting point and boiling point of zinc are approximately 420° C. and 907° C., respectively, and there are much lower than the melting point of iron, which is approximately 1535° C. Accordingly, merely overlaying galvanized steel sheets such that galvanized layers face each other and irradiating a weld portion with a laser in that state results in the formation of hole defects (a kind of weld defects) such as pits, porosities, and worm holes due to a phenomenon in which zinc in the galvanized layers blows away surrounding molten metal when evaporating or remains in the molten metal as bubbles.

One countermeasure is to provide a gap of approximately 0.1 mm for venting zinc vapor between galvanized steel sheets to be welded by laser lap welding, and to perform laser lap welding in that state using, for example, a YAG laser having a power of approximately 4 kW at a speed of approximately 3 to 4 m/min.

Furthermore, to efficiently form the gap, the following has been proposed: the vicinity of a portion of one of the galvanized steel sheets to be welded by laser lap welding is irradiated with a laser in advance to be bent, and then, laser lap welding is performed at, for example, a power of approximately 6 kW and a speed of approximately 5 m/min (claim 1 and paragraph 0026 of Patent Document 1).

In addition, for the case in which laser lap welding is performed on three or more galvanized steel sheets, the following has been proposed: for example, in a state in which gaps of approximately 10% of the sheet thickness are provided between the galvanized steel sheets, respectively, welding is performed at a speed of approximately 1.5 m/min by applying a continuous wave having a power of approximately 2.5 kW. This is also based on an idea similar to the aforementioned one to the effect that a gap for venting zinc vapor is formed between steel sheets to be welded (claims 1 and 2 and paragraphs 0019 and 0021 of Patent Document 2).

Patent Document 1: JP-A 2005-144504
Patent Document 2: JP-A 2005-262226

DISCLOSURE OF THE INVENTION

Problems to be Solved by the Invention

However, forming a gap of approximately 0.1 mm between galvanized steel sheets overlaid on top of each other requires much effort, and this makes process management difficult. For example, in the invention described in the aforementioned Patent Document 1, laser irradiation needs to be performed twice. In particular, in the automobile industry, the number of galvanized steel sheets to be processed is large, and furthermore, the sheet thicknesses thereof are approximately 1 mm. Accordingly, more effort is required, and process management is more difficult.

As described previously, laser beam welding has excellent technical characteristics compared to spot welding. Accordingly, galvanized steel sheets welded by laser lap welding also have excellent properties. However, laser lap welding for a galvanized steel sheet has not been widely employed yet because of its high initial installation cost and difficulties such as described above.

Accordingly, in order to make use of excellent characteristics of laser lap welding also for galvanized steel sheets, there has been demanded the development of a laser lap welding method for a galvanized steel sheet by which the laser lap welding of a large number of galvanized steel sheets can be performed without much effort and for which process management can also be easily performed.

Means for Solving the Problems

In order to achieve the above object, a laser lap welding method for a galvanized steel sheet according to the present invention, includes: preparing two steel sheets in lapped configuration, at least one of which is the galvanized steel sheet, so that a galvanized layer thereof is located at an interface of the steel sheets; and irradiating a surface of any one of the two steel sheets in an overlapped region with a laser to perform lap welding, wherein said irradiating includes applying the laser to travel at a predetermined power density and at a predetermined traveling velocity so as to partially and temporarily form an elongated hole in a molten pool extending backward from a laser irradiation spot at least in the steel sheet on the surface side, whereby metal vapor produced by laser irradiation is vented through the elongated hole backward in a laser traveling direction and in a laser irradiation source side.

In the above-described method, zinc vapor produced by the evaporation of zinc on the overlaid surface is vented through an elongated hole produced in a molten pool without adversely affecting the molten pool. As a result, excellent laser lap welding without hole defects can be performed.

Specifically, since welding is performed at a high speed and a high energy density by adjusting irradiation conditions such as the power, irradiation power density, irradiation spot diameter, defocus amount, and traveling speed of the laser, the laser irradiation spot and a keyhole (recess in the molten pool produced by the evaporation of metal) do not coincide. Furthermore, the evaporation of metal concentrates on the front end of the keyhole in the traveling direction of laser irradiation. Metal vapor is vented backward of the traveling direction of laser irradiation toward a laser irradiation source side (obliquely upward toward the back in the case in which galvanized steel sheets are overlaid on top of each other). Accordingly, the keyhole is an elongated hole. Furthermore, zinc vapor escapes mainly from the leading edge and surrounding portion of the elongated hole and also from side walls. Thus, the zinc vapor does not blow away molten metal in the molten pool on the side of the laser irradiation source side (upper side in the case in which galvanized steel sheets are overlaid on top of each other) when the zinc vapor escapes, and does not remain in the molten pool. As a result, the laser lap welding of a large number of galvanized steel sheets can be carried out without much effort, process management can also be easily performed, and laser lap welding having excellent technical characteristics can be widely used in lap welding for a galvanized steel sheet.

The present invention includes all the following cases: where a galvanized layer is provided on one or both sides of the steel sheet on the laser irradiation surface side of the two steel sheets, and a galvanized layer is not provided in the other steel sheet; where a galvanized layer is provided on one or both sides of the steel sheet on the laser irradiation surface, and a galvanized layer is also provided on one or both sides of the other steel sheet; and where a galvanized layer is not provided in the steel sheet on the laser irradiation surface side, and a galvanized layer is provided on one or both sides of the other steel sheet.

Furthermore, "overlaying such that a galvanized layer thereof becomes a contact surface" means overlaying such that zinc layers are in contact surfaces of overlaid steel sheets, and specifically means overlaying two steel sheets such that at least one of the galvanized layers provided in the steel sheet on the laser irradiation surface side and the other steel sheet becomes a contact surface.

Here, the "galvanized steel sheet" is a mainly automotive one which has a thickness of 0.5 to 2 mm and which includes a galvanized layer with a thickness of 4 to 12 μm. The steel is mild steel, alloy steel, high-tensile steel, or the like. The galvanization is not limited to plating with pure zinc, and may be plating with a metal containing zinc as a chief material as long as effects of the present invention are exerted.

Moreover, the "elongated hole" refers to an elongated keyhole in the molten pool reaching the galvanized layer. The term "elongated" means that the length in the laser traveling direction is longer than the width in a direction perpendicular to the laser traveling direction, preferably that the length is twice or more the width, more preferably that the length is three times or more the width, even more preferably that the length is four times or more the width.

Moreover, "adjusting the power and irradiation power density of the laser and irradiation conditions" includes selecting a laser device of an appropriate type or a laser device having an appropriate power, and adjusting the irradiation spot diameter and defocus amount of the laser and the traveling speed of laser irradiation. Thus, the elongated hole is formed in the molten pool formed by laser irradiation and made of molten steel so that when zinc in the plated layer located below the elongated hole evaporates, the zinc may not blow away molten metal which would normally exist above the zinc.

In addition to the above, since steel sheets are welded with a laser, it is preferable to use an inert gas. This is the same as in general laser beam welding. A gas such as argon, helium, nitrogen, or carbonic acid gas is blown from the traveling direction to the weld portion at a flow rate of approximately 20 to 80 L/min. Furthermore, in the case of an automotive galvanized steel sheet, argon at approximately 30 L/min is preferable from the viewpoints of cost, quality, and the like. It should be noted, however, that the present invention does not exclude laser remote welding and the like in which no gas is used.

It should be noted that even the case in which three or more steel sheets are lap-welded is not excluded from the present invention as long as a welding method for two of the steel sheets satisfies the above-described requirements.

The method of the present invention can be preferably carried out particularly in a case in which the steel sheet on the surface side has a thickness of 0.5 to 2 mm, and the galvanized layer has a thickness of 4 to 12 μm.

However, individual welding conditions are specifically determined in accordance with the thickness and the like of the steel sheet on the irradiation surface side to be welded, while adjustment is being made in consideration of other conditions. For example, in the case in which the sheet thickness is large, if other conditions are the same, the laser power density is increased in proportion to the sheet thickness not only so that the molten pool (weld penetration) may be merely deepened but also that the "elongated hole" may be formed deeply. Moreover, even for the same sheet thickness, in the case in which the power density of laser irradiation is increased, the traveling velocity of laser irradiation is increased in proportion thereto.

The "steel sheet" of the "steel sheet on the side of the laser irradiation surface" in the present invention may be a galvanized steel sheet having one or both sides thereof galvanized or may be a steel sheet without a galvanized layer. In other words, the "galvanized steel sheet" may be located on the side of the laser irradiation surface, the side opposite to the laser irradiation surface, or both sides. Moreover, the "thickness of the galvanized layer" refers to the thickness of the galvanized layer of one steel sheet.

The "power of the laser" is preferably large from the viewpoint of increasing the traveling velocity of irradiation while appropriately forming an elongated hole through the leading edge of which zinc vapor escapes. However, excessively high power, e.g., 20 kW or more and the like, is not preferable because of high equipment cost and the like.

In the method of the present invention, it is preferable that the power of the laser be 5 kW or more, and that the power density of the laser irradiation be 10 kW/mm$^2$ or more when calculated assuming a Gaussian shape.

In the method of the present invention, laser energy at a density higher than heretofore used is applied to a weld portion at a speed higher than heretofore. Accordingly, in laser lap welding for a galvanized steel sheet having a sheet thickness and a galvanized layer thickness such as defined above, sounder welding can be performed. Metal existing in the middle of the irradiation surface of the steel sheet in the weld portion, i.e., existing at the center of the focal point and on the line along the traveling direction, is irradiated for a longer time than side portions (directions perpendicular to the traveling direction) of the irradiation surface, and therefore evaporates earlier as well as escapes obliquely upward toward the back while pushing the surrounding molten metal sideways and backward of the traveling direction. Accordingly, an elongated recess (elongated keyhole) is rapidly formed in the molten pool. Furthermore, this elongated recess comes to have a depth reaching the galvanized layer, and evaporated zinc escapes through the leading edge of this elongated recess obliquely upward toward the back. As a result, sound laser lap welding can be performed at high speed.

In the method of the present invention, it is preferable that the power density of the laser irradiation be 15 kW/mm$^2$ or more when calculated assuming a Gaussian shape.

Here, the "power density of laser irradiation" is preferably large to some extent from the viewpoint of performing robust lap welding by deep weld penetration of two steel sheets with each other. However, increasing the power density of laser irradiation to a certain level or higher, e.g., 30 kW/mm$^2$ or more and the like, is not preferable from the viewpoint of energy cost (efficiency). Moreover, a small sheet thickness, in particular, a small sheet thickness on the laser irradiation side, results in an excess of energy, and is also not preferable.

In the method of the present invention, it is preferable that the irradiation spot diameter of the laser be 0.1 to 2 mm, the focal length of a lens of a device emitting the laser is 100 to 1500 mm, and the defocus amount of the laser is 0 to 30 mm.

When the irradiation spot diameter (size of the focal point) and defocus amount of the laser are optimized, temperature conditions and the like at and near the weld portion contribute to sound laser lap welding. Accordingly, for example, with an appropriate traveling velocity maintained, a molten pool can be formed, and the depth and width thereof become appropriate. Thus, zinc vapor produced in the galvanized layer easily escapes. As a result of these, sounder laser lap welding can be obtained.

In the method of the present invention, it is preferable that the steel sheet on the laser irradiation surface side have a thickness of 0.7 to 1.2 mm, the galvanized layer of the galvanized steel sheet have a thickness of 5 to 10 μm, the power of the laser be 8 kW or more, the power density of the laser irradiation be 18 kW/mm$^2$ or more when calculated assuming a Gaussian shape, the irradiation spot diameter of the laser be 0.1 to 1.2 mm, the focal length of a lens of a device emitting the laser be 150 to 1200 mm, and the defocus amount of the laser be 0 to 20 mm.

This defines a most preferable range of other requirements in the case in which a steel sheet having a thickness of 0.7 to 1.2 mm is used as the steel sheet on the laser irradiation surface side of the two steel sheets.

It should be noted that the thickness of the steel sheet on the side opposite to the laser irradiation side of the two steel sheets is not particularly limited. In other words, the thickness of the steel sheet on the side opposite to the laser irradiation side does not seem to significantly affect the following process: the steel sheet on the laser irradiation side evaporates to produce a laser-induced plume, an elongated keyhole is formed, and zinc in contact portions of the two steel sheets evaporates through the elongated keyhole without blowing away molten metal on the laser irradiation side. Accordingly, if the steel sheet on the laser irradiation side has a thickness of 0.7 to 1.2 mm, as long as the thickness of the steel sheet on the opposite side does not significantly change, the present invention defining preferable welding conditions can be applied without change, and it seems that very excellent laser lap welding can be performed.

Moreover, in laser lap welding for a galvanized steel sheet having the aforementioned steel sheet thickness and galvanized layer thickness, for the aforementioned reasons, the "power density of laser irradiation" is preferably 24 kW/mm$^2$ or less when calculated assuming a Gaussian shape, and in practice preferably 18 to 22 kW/mm$^2$. Similarly, the power of the laser is preferably 20 kW or less, and more preferably approximately 5 to 15 kW from an overall viewpoint.

For example, in the case in which the irradiation power density and power of the laser are within the above-described ranges and where the irradiation spot diameter and defocus amount of the laser are approximately 0.3 mm and 15 mm, respectively, the traveling speed of laser irradiation is approximately 10 m/min for a laser power of 5 kW, approximately 11 m/min for a laser power of 7 kW, approximately 12 mm/min for a laser power of 10 kW, and approximately 15 m/min for a laser power of 13 kW.

It should be noted that the "steel sheet" of the "steel sheet on the side of the laser irradiation surface", the "galvanized steel sheet", and the "thickness of the galvanized layer" are the same as described above.

Moreover, with regard to influences of the "thickness of the galvanized layer" on welding conditions, since the amount of zinc itself in the galvanizing is smaller than that of the steel sheet, and the melting point of steel is much higher than the boiling point of zinc, the thickness of the galvanized layer has a relatively small influence on the time required for the evaporation of the galvanizing due to irradiation with intense laser energy, the evaporation of zinc vapor through the leading edge of the elongated hole without blowing away the molten metal in the molten pool, and the like. Accordingly, welding conditions do not seem to need to be significantly changed in accordance with the thickness of the galvanized layer.

In the method of the present invention, it is preferable that the laser be a fiber-optic laser and use wavelengths in the 1000 nm band.

Welding is made easy by using a laser which is a fiber-optic laser (a fiber transmission laser, a fiber-optic laser for welding, or the like) and which has a wavelength of 1000 nm suitable for a fiber-optic laser (800 to 1500 nm for a fiber-optic laser, and 1000 to 1100 nm for a fiber-optic laser for welding). In particular, this makes easy the setting of the irradiation spot, the adjustment of the focal point and the like, and the adjustment of the traveling speed.

Effects of the Invention

As described above, the present invention enables laser lap welding of a large number of galvanized steel sheets to be carried out without much effort, enables process management to be easily performed, and enables laser lap welding having excellent technical characteristics to be widely used in lap welding for a galvanized steel sheet.

EXPLANATION OF REFERENCE NUMERALS

10 FIBER
11 LENS

17 LASER BEAM
18 FOCAL POINT OF LASER BEAM
19 LASER IRRADIATION SPOT
20, 21 GALVANIZED STEEL SHEET
30 NOZZLE
35, 36 HOLDING JIG
40 MOLTEN PORTION LEADING EDGE
41 LASER-INDUCED PLUME
42 ELONGATED HOLE
45, 46 MOLTEN POOLS PRODUCED ON TWO OPPOSITE SIDES OF ELONGATED HOLE
47 MOLTEN POOL BEHIND ELONGATED HOLE
48 WELD BEAD

BEST MODE FOR CARRYING OUT THE INVENTION

Hereinafter, the present invention will be described based on the preferred embodiment thereof. It should be noted that the present invention is not limited to the following embodiment. Various modifications can be made to the following embodiment within the scope of the present invention and equivalents thereof.

Figure 1:
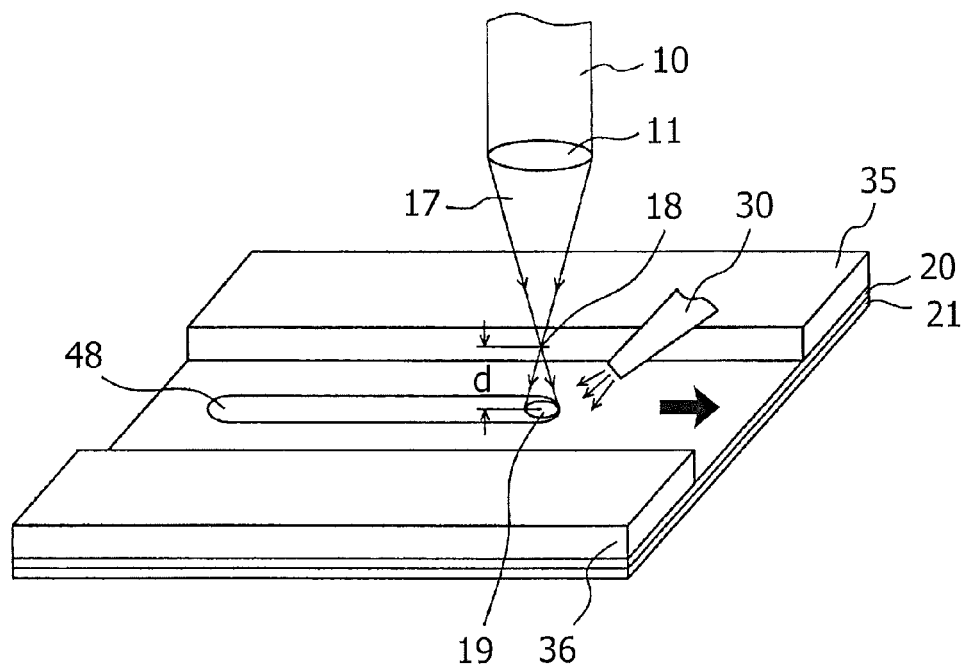
FIG. 1 is a perspective view showing laser lap welding for a galvanized steel sheet as one example of the present invention.

FIG. 1 conceptually shows a situation in which laser lap welding for a galvanized steel sheet as one example of the present invention is being performed. In FIG. 1, reference numeral 10 denotes a fiber of a laser oscillator, reference numeral 11 denotes a lens, reference numerals 20 and 21 denote galvanized steel sheets overlaid on top of each other (top is 20, and bottom is 21), reference numeral 30 denotes a nozzle for blowing an inert gas, and reference numerals 35 and 36 denote holding jigs for the galvanized steel sheets. Furthermore, reference numeral 17 denotes a laser beam, reference numeral 18 denotes the focal point of the laser beam, arrows in rays of light representing the laser beam 17 indicate the irradiation direction of the laser, reference numeral 19 denotes a laser irradiation spot formed on the galvanized steel sheet 20, and reference numeral 48 denotes a weld bead. Moreover, a bold arrow indicates the traveling direction (direction in which welding is performed) of laser irradiation, and thin arrows drawn ahead of the tip of the nozzle 30 indicate the flow of the inert gas. Furthermore, d denotes the defocus amount of laser irradiation.

The two galvanized steel sheets 20 and 21 are intended for a general automobile, and each thereof is a steel sheet with a thickness of 1 mm which is plated with zinc of 5 μm in thickness on both sides thereof. Before laser lap welding, these two galvanized steel sheets 20 and 21 are overlaid on top of each other after oil and soil on the surfaces thereof are wiped off using ethanol, and further fixed with the holding jigs 35 and 36 at respective two opposite ends thereof. Accordingly, the upper and lower galvanized steel sheets 20 and 21 are in intimate contact with each other such that galvanized layers become contact portions.

As the laser oscillator, a laser oscillator manufactured by IPG Photonics Japan, Ltd. is used which has a power of 10 kW and a wavelength of 1070 nm. The laser beam 17 emitted from the fiber 10 of this laser oscillator is caused to travel in the welding direction (to the right in the drawing) while being applied from a direction perpendicular to the surface of the weld face (galvanized steel sheet 20). At the time of welding, the lens 11 is adjusted such that the laser beam 17 is focused 15 mm before the weld face (in the drawing, directly above the weld face) (defocus amount=15 mm) and that the spot diameter is 1.1 mm, and the laser beam 17 is caused to travel at 12 m/min. Accordingly, the power density at the weld portion is 21 kW/mm$^2$ if the cross-sectional intensity distribution is assumed to have a Gaussian shape. It should be noted that the focal length of the lens 11 in this example is 250 mm.

As the inert gas, Ar is used which is an inexpensive inert gas. The inert gas is blown from ahead of the laser beam in the traveling direction thereof and from 45 degrees above at a flow rate of 30 L/min using the nozzle 30 having a bore of 16 mm.

Figure 2:
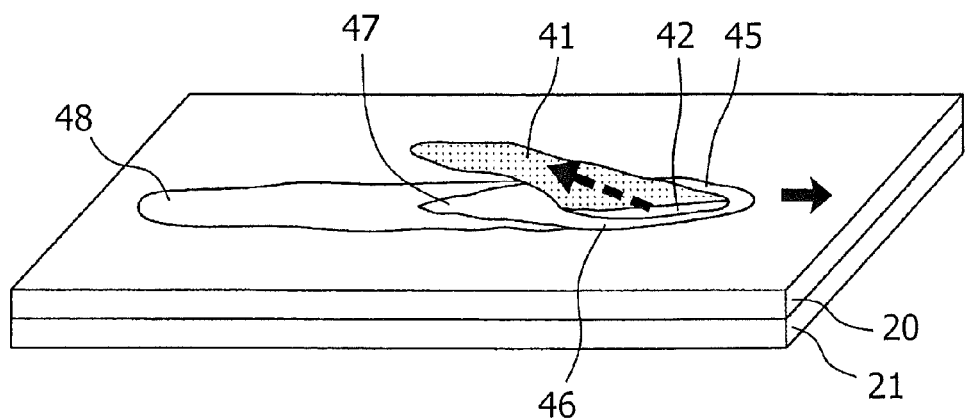
FIG. 2 is a perspective view conceptually showing the behaviors of molten liquid and vapor of weld metal at the time of the welding shown in FIG. 1.
Figure 3:
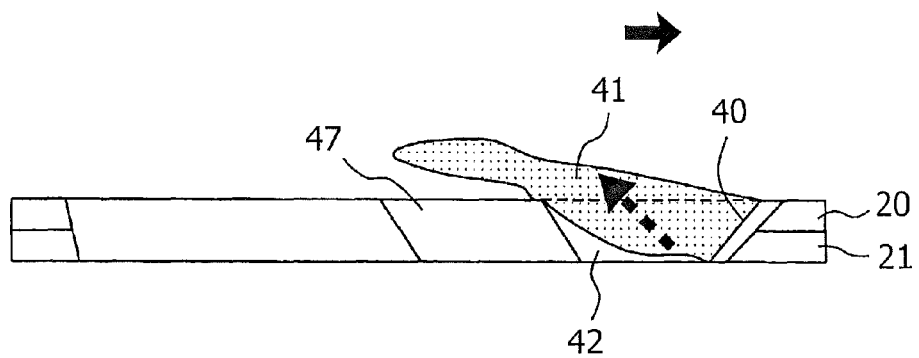
FIG. 3 is a cross-sectional view which conceptually shows a weld portion at the time of the welding shown in FIG. 1 and which is taken along the traveling direction.
Figure 4:
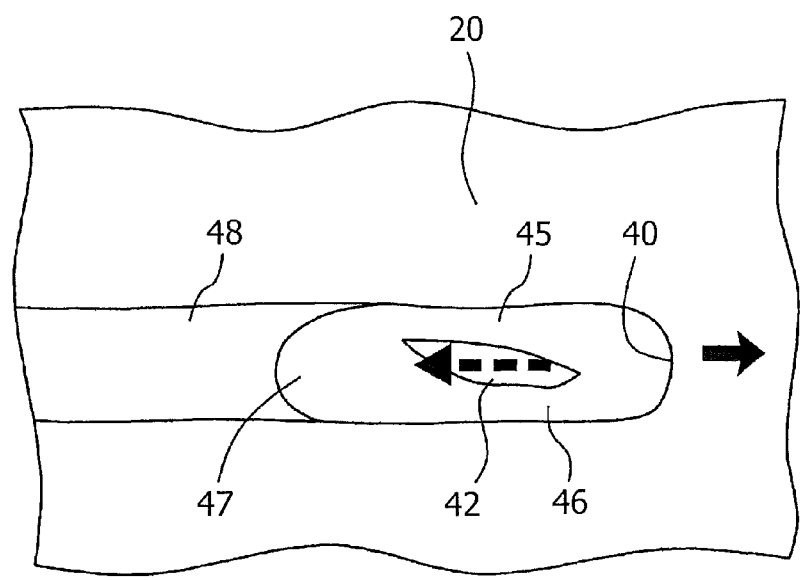
FIG. 4 is a view conceptually showing the weld portion as viewed from above at the time of the welding shown in FIG. 1.

FIGS. 2 to 4 conceptually show the behaviors of a molten wave and vapor of weld metal at the time of the welding. FIG. 2 shows the weld portion as viewed sideways and obliquely from above. FIG. 3 shows a cross section of the weld portion taken along the traveling direction. FIG. 4 shows the weld portion as viewed from above. In these drawings, reference numeral 40 denotes a molten portion leading edge, reference numeral 41 denotes a laser-induced plume, reference numeral 42 denotes an elongated hole (elongated keyhole) produced by venting metal vapor, reference numerals 45 and 46 denote molten pools produced on two opposite sides of the elongated hole 42, and reference numeral 47 denotes a molten pool behind the elongated hole. Moreover, in these drawings again, bold arrows indicate the traveling direction of laser irradiation. Furthermore, an arrow accompanied by a bold broken line indicates the flow of metal vapor.

The upper and lower galvanized steel sheets 20 and 21 are melted by laser irradiation. Since irradiation energy density is large, the molten portion leading edge 40 melts steeply and deeply on the back side in the traveling direction. Part of the metal rapidly evaporates from the surface. Furthermore, metal vapor (laser-induced plume) produced by rapid evaporation is vented backward and upward (toward the laser irradiation side) from a portion slightly behind the irradiation portion (from the side opposite to the traveling direction, i.e., from the left side of the irradiation portion in the drawing) while pushing liquid metal around and above the metal vapor (laser irradiation side) toward the back and side in the traveling direction.

The reason why the laser-induced plume 41 blows out in the above-described direction is not only that a portion near the center line of the irradiation portion in the traveling direction is subject to the longest laser irradiation time and the highest laser beam power density, but also that an unmelted solid metal layer exists on the side in the traveling direction of irradiation, the side in the irradiation direction (lower side in FIGS. 2 and 3), and both sides of the irradiation portion in the traveling direction (above and below the irradiation portion in FIG. 4). Accordingly, the laser-induced plume 41 is produced along the center line of the irradiation portion in the traveling direction. Consequently, the laser-induced plume 41 is produced behind the laser irradiation spot and along the center line of irradiation in the traveling direction. As a result, a hole 42 in which no molten metal exists and which is long in the traveling direction is produced at that position. Moreover, elongated molten pools 45 and 46 are produced on both sides of this elongated hole 42 in the traveling direction, and further flow in the direction opposite to the traveling direction due to metal vapor pressure to merge into a molten pool 47 behind the elongated hole 42 in the traveling direction. In this example, it was observed that an elongated hole (elongated keyhole) with a width of approximately 1 mm and a length of approximately 3 mm was formed.

In the present invention, not only is an elongated hole simply formed, but also zinc vapor jets as the laser-induced plume 41 or part thereof obliquely upward toward the back from the leading edge and surrounding portion of the formed elongated hole. Accordingly, molten metal around and above the zinc vapor is not blown away or is blown away only slightly. Furthermore, the zinc vapor does not remain in a molten pool.

Zinc has a melting point (419.5° C.) and a boiling point (907° C.) which are much lower than the melting point (1535° C.) of iron as described previously, and also has a small melting heat and a small vaporization heat (7.322 kJ/mol and 115.3 kJ/mol, respectively) (those of iron, which is the chief material of a steel sheet, are 13.8 kJ/mol and 349.6 kJ/mol, respectively. It should be noted, however, that actually these four values are slightly changed by the influences of additives and compounds in zinc and a steel sheet). Accordingly, if the amount of heat transferred from the steel sheet located on the laser irradiation side is large, zinc instantly melts and evaporates, and further a large amount of produced zinc vapor blows away molten metal existing above the zinc vapor.

However, iron has a smaller thermal conductivity than copper and the like, and liquid as molten iron has a further smaller thermal conductivity than solid iron. Moreover, as described previously, zinc has a small heat of vaporization, and on the other hand, irradiation energy density is large. Furthermore, the focal length, defocus amount, and the like of a laser irradiation apparatus are appropriate. As a result of these, steel gradually melts and evaporates from the irradiated-side surface of a galvanized steel sheet, and then zinc in the irradiation portion on the contact surfaces of the galvanized steel sheets 20 and 21 rapidly melts and evaporates due to the energy of laser irradiation to be vented from the leading edge and surrounding portion of the aforementioned elongated hole. Accordingly, favorable lap welding is performed.

Figure 5:
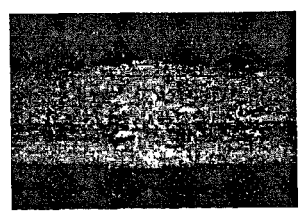
FIG. 5 is a photomicrograph of a cross section of a laser lap weld portion in a direction perpendicular to the traveling direction of laser irradiation.

A sample welded by this example was cut in a direction perpendicular to the traveling direction of laser irradiation, and the cross section was observed with a microscope to investigate the state of the welding. FIG. 5 is a photomicrograph of the above-described cross section. As shown in FIG. 5, no weld defect was found in the cross section, and it can be seen that the method of the present invention enables favorable laser lap welding for a galvanized steel sheet to be performed without providing a gap between two steel sheets.

The invention claimed is:

1. A laser lap welding method for a galvanized steel sheet, comprising:
    preparing two steel sheets in lapped configuration with no gap, at least one of which is the galvanized steel sheet, so that a galvanized layer thereof is located at an interface of the steel sheets; and
    irradiating a surface of any one of the two steel sheets in an overlapped region with a laser to perform lap welding,
    wherein said irradiating includes applying the laser to travel at a predetermined high power density and at a predetermined high traveling velocity selected proportionally to the power density, so as to partially and temporarily form an elongated hole, in which the length in the laser traveling direction is at least twice of the width, in a molten pool extending backward from a laser irradiation spot at least in the steel sheet on the surface side, whereby metal vapor produced by laser irradiation is vented through the elongated hole backward in a laser traveling direction and in a laser irradiation source side.

2. The laser lap welding method for a galvanized steel sheet according to claim 1, wherein the steel sheet on the surface side has a thickness of 0.5 to 2 mm, and the galvanized layer has a thickness of 4 to 12 µm, the power of the laser is at least 5 kW, and the power density of the laser irradiation is at least 10 kW/mm$^2$ when calculated assuming a Gaussian shape, the traveling velocity is at least 10 m/min.

3. The laser lap welding method for a galvanized steel sheet according to claim 2, wherein the power density of the laser irradiation is at least 15 kW/mm$^2$ or more when calculated assuming a Gaussian shape.

4. The laser lap welding method for a galvanized steel sheet according to claim 3, wherein the irradiation spot diameter of the laser is 0.1 to 2 mm, the focal length of a lens of a device emitting the laser is 100 to 1500 mm, and the defocus amount of the laser is 0 to 30 mm.

5. The laser lap welding method for a galvanized steel sheet according to claim 1, wherein the steel sheet on the laser irradiation surface side has a thickness of 0.7 to 1.2 mm; the galvanized layer of the galvanized steel sheet has a thickness of 5 to 10 µm; the power of the laser is at least 8 kW or more; the power density of the laser irradiation is 18 kW/mm$^2$ or more when calculated assuming a Gaussian shape; the irradiation spot diameter of the laser is 0.1 to 1.2 mm; the focal length of a lens of a device emitting the laser is 150 to 1200 mm; and the defocus amount of the laser is 0 to 20 mm.

6. The laser lap welding method for a galvanized steel sheet claim 1, wherein the laser is provided as a fiber-optic laser, and the wavelengths thereof is selected in the 1000 nm band.

7. The laser lap welding method for a galvanized steel sheet according to claim 1, wherein welding is performed while an inert gas is being blown from ahead of the laser irradiation spot in the laser traveling direction.

8. The laser lap welding method for a galvanized steel sheet according to claim 4, wherein the laser is provided as a fiber-optic laser, and the wavelengths thereof is selected in the 1000 nm band.

9. The laser lap welding method for a galvanized steel sheet according to claim 5, wherein the laser is provided as a fiber-optic laser, and the wavelengths thereof is selected in the 1000 nm band.

* * * * *